INVENTOR.
SIDNEY S. McINTYRE
BY Cook & Robinson
ATTORNEYS

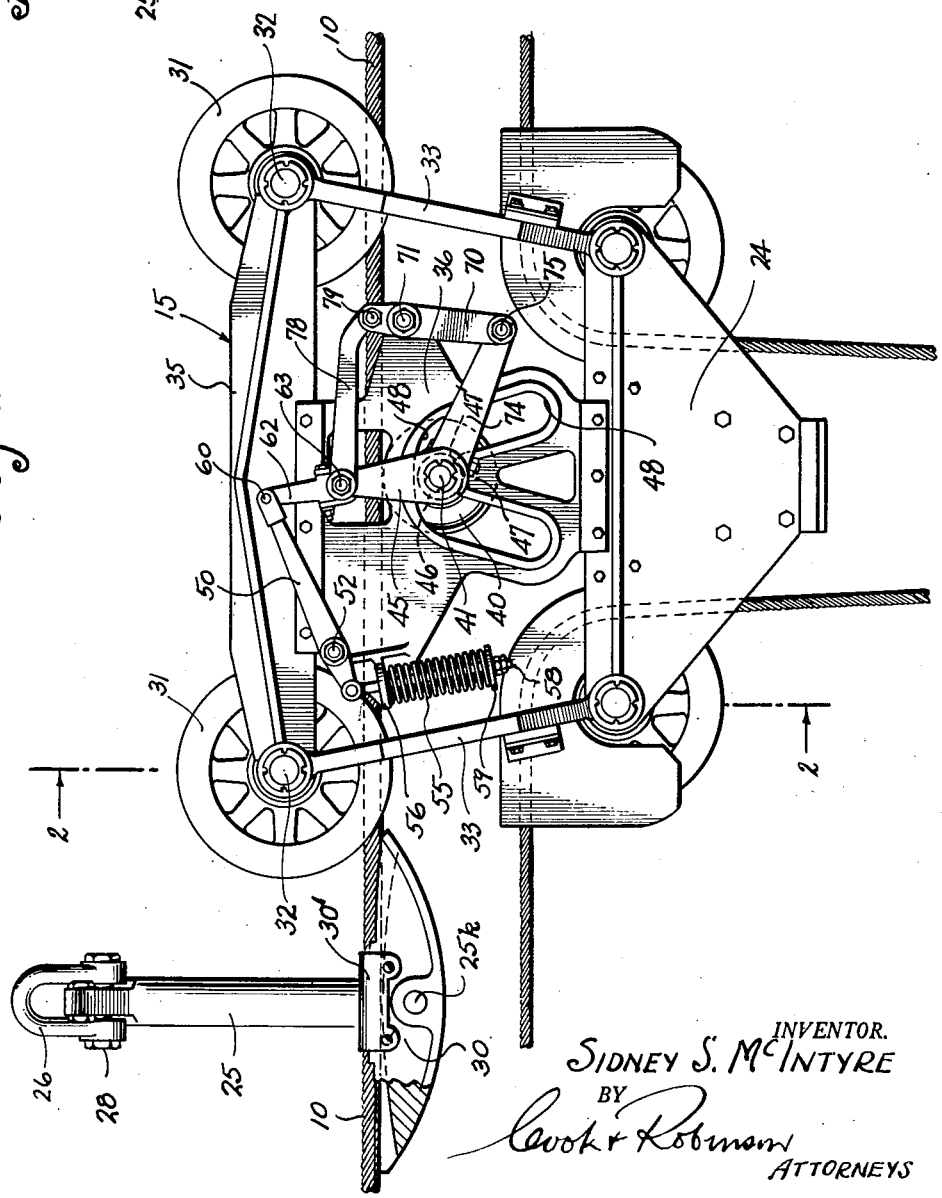

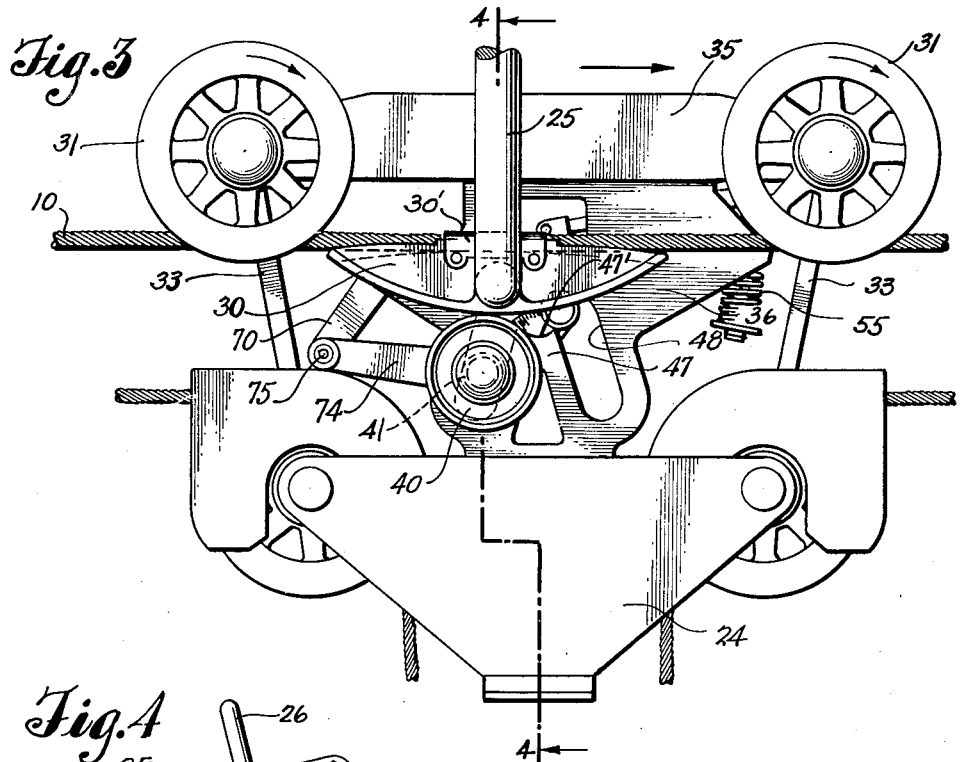
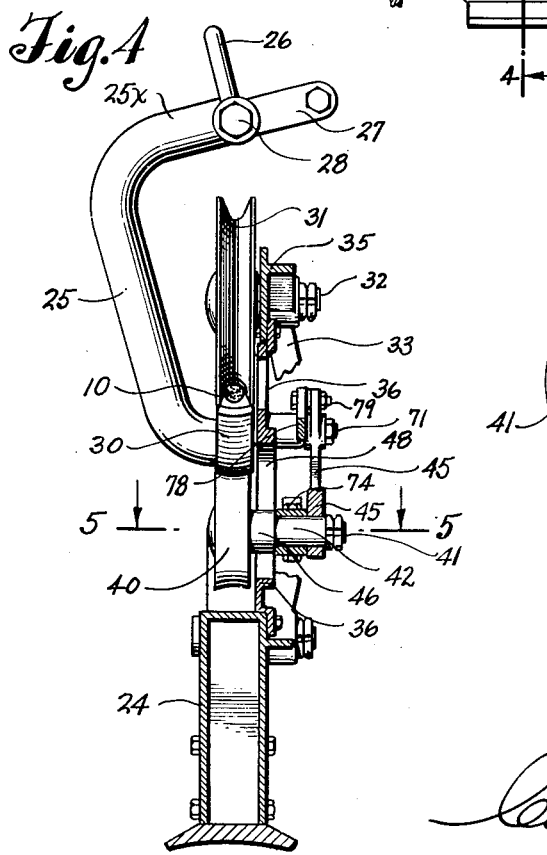
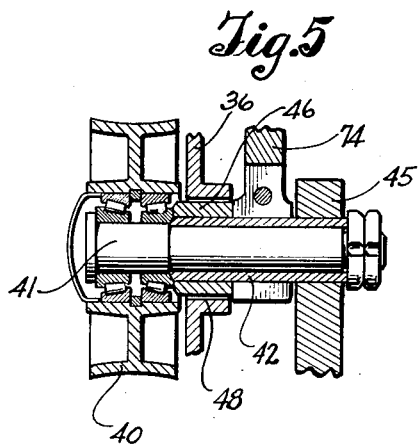

June 10, 1952 S. S. McINTYRE 2,600,066
OPEN SIDE CABLE CARRIAGE
Filed Nov. 3, 1950 4 Sheets-Sheet 4
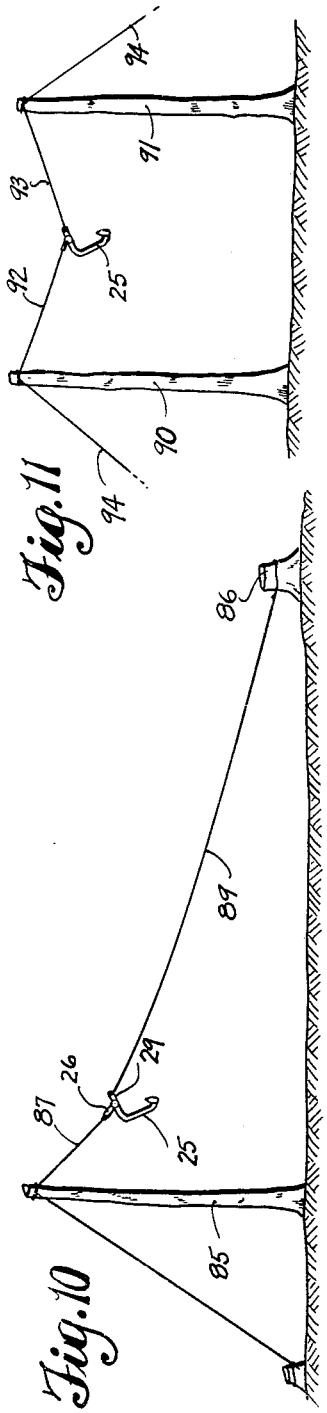
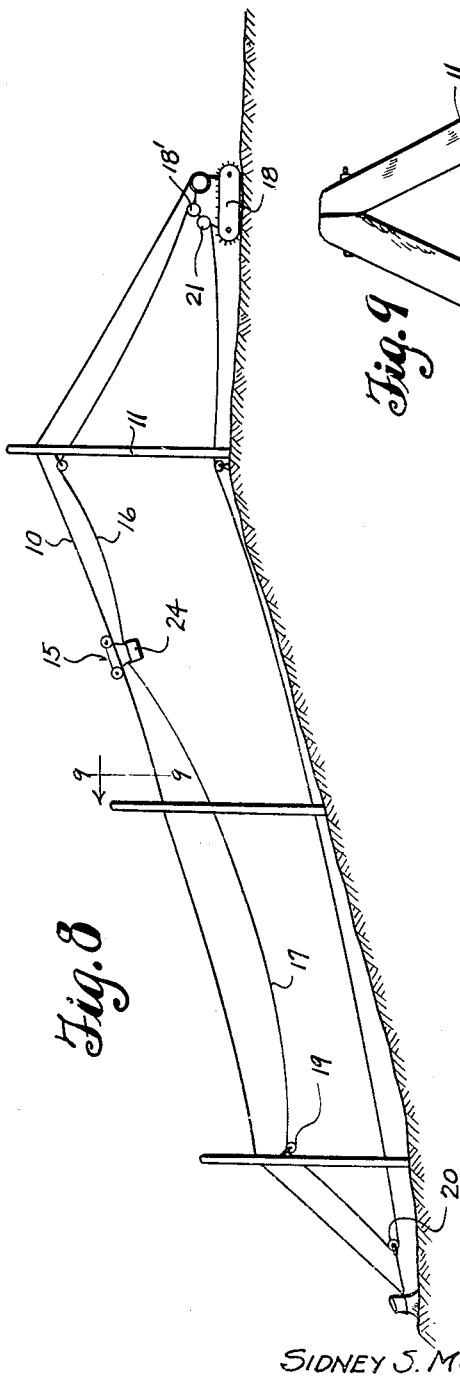
INVENTOR.
SIDNEY S. McINTYRE
BY
Cook & Robinson
ATTORNEYS Patented June 10, 1952

2,600,066

UNITED STATES PATENT OFFICE 2,600,066

OPEN SIDE CABLE CARRIAGE

Sidney S. McIntyre, Sedro Woolley, Wash.

Application November 3, 1950, Serial No. 193,854

10 Claims. (Cl. 212—122)

This invention relates to improvements in load carrying carriages as designed for travel on suspended tram line cables, for example, carriages as used in the logging industry for the skyline method of yarding logs; or carriages designed to travel on cable tracks in mining operations to convey ore over rough terrain from mine to smelter, and to carriages, as used for various other analogous operations which operate on cable trackways.

Explanatory to the present invention, it will be here mentioned that skyline logging with closed carriages has been quite extensively used. However, in the use of any closed carriage, the operating distance is limited to the single span of the tram line cable, as drawn between head and tail trees. By use of an open side carriage, the operating range can be greatly extended because it permits the use of track cable suspending jacks for the support of the cable at intervals between the head and tail trees and the distance between them can be materially increased. As heretofore designed, open side carriages have not been satisfactory for yarding logs from both sides of the track cable, mainly because of the danger of the carriage falling off the cable if tilted sidewise too far with the open side faced upwardly. Also because of the carriage wheels bouncing off the cable when passing over the cable supporting jacks.

In view of these aforementioned and other disadvantages or objections to use of open side carriages, as heretofore provided, it has been the principal object of this invention to provide an open side carriage, equipped with wheels for its travel on a track cable that is supported at intervals by means of suspending jacks, and to equip the carriage with means for positively preventing the carriage from being displaced or functionally dismounted from the track cable by reason of tilting, jumping or from their operational causes.

It is a further object of the present invention to provide an open side carriage, mounted by grooved wheels, in tandem, for guided travel upon a track cable that is supported at intervals therealong by means of suspending jacks, and to equip the carriage with means for positively retaining it on the track cable; said means including a retaining wheel that is arranged for travel in holding contact with the under side of the track cable between the places of contact of the carriage wheels. Furthermore, to provide a yieldable mounting means on the carriage frame structure for support of the retaining wheel that permits the latter to pass by the cable mounting shoes of the supporting jacks without momentarily impairing the function of the retaining means.

It is a further object of this invention to equip an open side carriage with a positive retaining means of the character above stated, that is operable in either direction of travel of the carriage; that is simple in construction; that is practical in use and which has the parts thereof supported from and compactly confined within the dimensional limits of the carriage frame structure.

Further objects of the invention reside in the details of construction and combination of parts and in the mode of use of the device as will hereinafter be fully described.

In accomplishing these and other objects of the invention, I have provided the improved details of construction, the preferred forms of which are illustrated in the accompanying drawings, wherein—

Fig. 1 is a side view of a carriage embodying the improvements of the present invention therein; the view showing the closed side of the carriage.

Fig. 2 is a cross-section, taken on line 2—2 in Fig. 1.

Fig. 3 is an elevation of the carriage as seen from the open side.

Fig. 4 is a cross-sectional detail taken on line 4—4 in Fig. 3.

Fig. 5 is an enlarged sectional detail taken on line 5—5 in Fig. 4.

Fig. 8 is a diagrammatic illustration of a tramline system employing the present open side carriage, and cable supporting jacks across which the carriage travels.

Fig. 9 is an enlarged cross-section on line 9—9 in Fig. 8.

Figure 6:
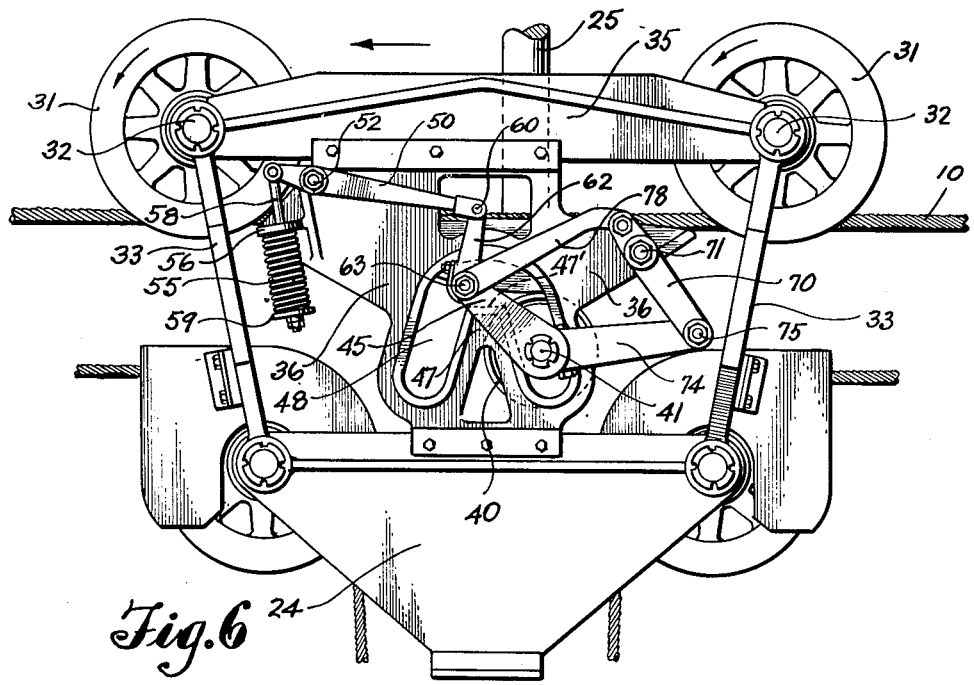
Fig. 6 is a side elevation of the carriage showing the position of the parts of the automatic resetting mechanism for the retaining wheel when the latter is moving across a jack shoe toward the left hand side.

Figs. 10 and 11, respectively, illustrate alternative means for support of a tramline cable.

Open side carriages, equipped with grooved supporting wheels for travel on cables supported at intervals by suspending jacks, have previously been used for the carrying of heavy loads, but to my knowledge such carriages have not been equipped with a positive, satisfactory means for retaining the carriages on the track cables under all conditions of use.

It has been quite advantageous, particularly in skyline logging operations, to eliminate the possibility of the carriage wheels being displaced from the supporting cable by use of a retaining mechanism that is carried on the carriage frame; this mechanism, which forms the subject matter of my invention, is characterized by use of a wheel or roller located intermediate the carriage wheels in position to engage in rolling contact with the under side of the track cable, and a supporting means for the wheel that positively holds it in position while traveling between cable suspending jacks, yet permits it to ride over or across the shoes of cable suspending jacks.

Referring more in detail to the drawings—

For purpose of describing the use and construction of the present open side carriage, I have diagrammatically illustrated, in Fig. 8, its use in connection with what is called a "down hill tramline system." In this view, the tramline cable, which I will refer to as the "supporting cable," or "track cable" is designated by reference numeral 10 and it is shown to be supported at intervals therealong between paired, diverging legs 11—11 arranged as shown in Fig. 9. Supports of other suitable kinds might be used without change in the invention.

The carriage which is designed for travel along the cable 10 is designated in its entirety by numeral 15, and it is here shown to be equipped with a "haulin" cable 16 and a "haulout" cable 17. The cable 16 is shown to extend to a power driven means such as the cable winding drum 18' of a log yarder engine designated at 18. Cable 17 extends through sheaves 19 and 20 and back to a winding drum 21 of the engine. By means of the drums 18' and 21, and their driving mechanism, and controls, the direction and rate of travel of the carriage on the track cable 10 can be controlled.

The carriage 15 is here shown to be equipped with means for the suspending of a load therefrom for transportation. However, it is not the intent that the present carriage be restricted to any particular use, or to the illustrated means of effecting its travel along the supporting cable, nor is it to be restricted in size or materials of its construction. Furthermore, the log suspending means which is herein designated in its entirety by reference numeral 24, can be considered to represent any form of load that is suspended from the carriage for transportation thereby.

The cable 10 is suspended between the diverging legs 11—11 of the supports by hangers of the kind best shown in Figs. 1 and 2. Each hanger comprises an angular bar 25 with laterally turned upper end portion 25x to which clevises 26 and 27 are secured by a pivot bolt 28. Ties 29 and 29 are attached to the clevises and to the legs 11—11 to suspend the hanger or jack. At its lower end, the bar 25 is equipped with an elongated shoe 30. This is centrally pivoted on a journal 25k at the lower end of the bar 25. This shoe has a grooved longitudinal channel in its top side in which the cable rests and is secured by an overlying strap 30'. The channel curves downwardly from a central point toward its ends to the approximate slope of the track cable under the weight of the carriage as it approaches the hanger. The bottom surface of the shoe is on a radius and is arcuately curved upwardly from the central line to thin edges at its ends which are substantially flush with the bottom edge of the cable 10.

In the operation of the carriage 15 along the cable 10, it is necessary that the carriage retaining wheel, presently described, be permitted to pass across the bottom surface of the hanger shoes in either direction of travel. The construction of the carriage and carriage retaining means will now be described.

In its present preferred form of construction the carriage comprises a longitudinal beam 35 equipped at its opposite ends with deep grooved wheels 31—31 mounted to rotate on mounting spindles 32—32 that are secured at the opposite ends of the beam. At the opposite ends of the beam 35, are hangers 33—33 by means of which the load 24 is suspended for transportation. The wheels 31—31 are adapted to run upon the cable 10 and to be held in upright or inclined position by a load suspended directly below or to either side of the cable 10.

Bolted to the lower edge portion of beam 35 between the wheels 31—31, is a vertically disposed plate 36. This extends in a vertical plane, parallel with the beam 35, and at its lower edge is bolted to the top edge of a plate that is suspended by the hangers 33—33 and which has been designated as the load 24. Supported from the plate 36 is an arrangement of links and levers that will presently be described in detail, by means of which the carriage retaining wheel 40 is supported to engage in rolling contact with the underside of the cable 10 as the means for preventing the carriage jumping from the cable 10.

It is shown in Figs. 4 and 5 that the wheel 40 is mounted to revolve freely on a spindle 41. The spindle is securely held in a sleeve 42 that has its outer end portion rigidly clamped in the lower end portion of an upwardly directed lever arm 45. A collar 46 is fitted about the sleeve 42, adjacent the hub of wheel 40 and is adapted to rest upon a supporting pedestal 47 formed in the plate 36, thus to positively hold the wheel 40 against the under side of cable 10 and against downward movement relative to the tandem wheels of the carriage.

It will here be explained that the spindle 41 extends from outside to inside of plate 36 through a guide slot 48. The slot 48 is in the form of an inverted U and the two leg portions thereof define the pedestal 47 between them. The upper end of this pedestal is formed with a downwardly curved seat 47' in which the collar 46, as applied to the horizontally disposed spindle sleeve, rests to hold the top of wheel 40 in close rolling contact with the under side of cable 10, as has been shown in Fig. 1. It will be understood that with the cable 10 under tension, it becomes in effect a rigid bar and the grooved carriage wheels 31—31 cannot be displaced therefrom so long as the wheel 40 is held in the position of support on pedestal 47 illustrated in Fig. 1. However, to permit the travel of the carriage past the shoes 30 of the cable supporting jacks 25 it is necessary that the wheel mounting spindle be displaced from the seat 47' and its position of support on the pedestal 47 and the wheel lowered relative to the line of the wheels 31—31.

Therefore, a means of support for the spindle 41 has been provided that permits the collar 46 to be automatically displaced from the seat upon the wheel 40 coming in contact with each shoe, in one direction or the other depending on the direction of travel of the carriage, and allowed to drop into one or the other of the legs of the slot 48, thus permitting the wheel 40 to move downwardly relative to wheels 31—31' and pass under the shoe, as has been shown in Fig. 3, maintaining such pressure against the shoe that it does not lose its function of holding the carriage wheels against displacement from the cable 10.

Figure 7:
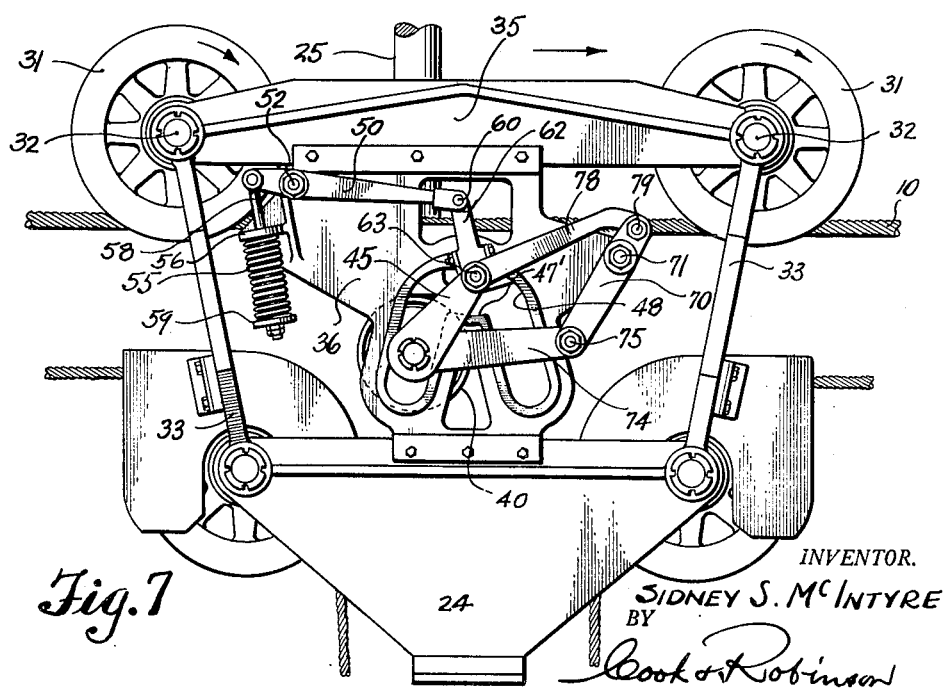
Fig. 7 is a similar view showing the position of the parts when the retaining wheel is moving across the jack shoe toward the right hand side.

A novel assembly of links and levers is employed for the functional support of the wheel 40, and a spring is associated therewith for the automatic restoration of the mechanism to that position at which the spindle collar is re-seated on the pedestal 47 as shown in Figs. 1, 6 and 7. In these views it is shown that a horizontally directed lever 50 is pivotally supported, at a point between its ends, from the upper left hand side of plate 36 by a pivot bolt 52. The lever is permitted to oscillate in a vertical plane, parallel with the plate. A coiled spring 55 is disposed with its upper end seated against a flange 56 formed on plate 36, and a bolt 58 is extended axially through the spring and through a hole in the flange and is pivotally attached at its upper end to the outer end of lever 50. The lower end of the bolt 58 mounts a disk 59 against which the spring 55 bears thus to exert a downward pull on the end of lever 50 to which the bolt is attached.

The inner end of lever 50 is pivotally connected, by means of a bolt 60, to the upper end of a relatively short link 62 which, at its lower end, is pivotally connected by a pivot bolt 63 with the upper end of the lever arm 45. The spring 55 is under compression at all times and thus operates to urge the inner end of lever 50 upwardly, thus through its connection with lever 45 to retain the mounting spindle 41 of wheel 40 at the top of the cam slot 48 and thus cause the collar 46 of the spindle to come to rest upon the upper end of pedestal 47, which is that for the normal locked position of the wheel.

To properly retain the operating relationship of wheel and cable there is provided a lever 70, normally vertically directed and pivoted on plate 36, at the right hand side thereof, by a bolt 71. This bolt extends through the lever 70 relatively close to its upper end, and a link 74 pivotally connects the lower end of lever 70 with the spindle sleeve 42; the connection with lever 70 being effected by a pivot bolt 75. Likewise, the upper end of lever 70 is connected by a link 78 with the upper end of lever arm 45; these connections at the ends of link 78 being made respectively by a bolt 79 and the bolt 63 which joins arm 45 and link 62.

It will be understood that by reason of the bolts 52 and 71 being mounted in plate 36 in a definitely fixed relationship, and the wheel 40 being suspended by the linkage located between and below these pivot points, the expanding force of spring 55 is always applied to effect an upward lifting force against the wheel 40. However, the spring will yield for that downward movement of the wheel as required for it to pass under the shoes of the cable suspending jacks, in rolling contact therewith.

If the carriage 15 is moving along cable 10 toward the left as shown in Fig. 1, and wheel 40 comes into contact with a hanger shoe 30, the wheel mounting spindle will be displaced from the pedestal 47 toward the right and will drop into the right hand leg of slot 48 as shown in Fig. 6. However, the spring 55 retains a lifting force on spindle 41 at all times and automatically reseats the spindle collar 46 on the pedestal seat 47' when the wheel has passed the shoe. Likewise, if the carriage is moving toward the right in Fig. 1 and the wheel 40 engages a shoe, the spindle will be displaced from the pedestal and move downwardly into the left leg of the slot 48, as in Fig. 7, as required for the wheel to pass the shoe without release of its carriage retaining function.

Attention is called to the fact that when the collar 46, as applied to the spindle 41, is resting in the upper end seat 47' of the pedestal 47, it is held firmly seated therein by reason of the wheel 40 bearing in rolling contact with the under side of the cable 10. Thus, the spindle is held with sufficient security on the pedestal 47 that it will not be unseated so long as there is no positive force applied against wheel 40 to unseat it. When such force is applied, such for example as that force directed against wheel 40 when it strikes the shoe 30 of a suspending jack 25, the impact will operate to displace sleeve 41 from rest in the pedestal seat 47' due to the fact that at the location of the shoe, that is, at points of suspension of the cable 10, the cable will not be in effect a straight bar but will be inclined slightly downward in opposite directions from the top center of the shoe, in accordance with the amount of sag of the cable between supporting jacks. By reason of this very slight sagging of the cable, the effect is the same as if the cable should be flexed slightly upward between the points of its contact with the wheels 31—31, thus permitting that slight upward lifting of the spindle 41 relative to the plate 36 that is required to displace sleeve 46 from rest within the downwardly curved seat 47' of the pedestal. It is noted in Fig. 1 that there is normally a slight clearance between the top of the cam slot 48 and top of sleeve 46 when the sleeve is at rest in the pedestal seat 47'. However, the spindle will be held seated by reason of the pressure of the cable 10 downwardly against wheel 40.

In Fig. 10 I have diagrammatically shown one form of support for a skyline cable that is frequently used in logging operations. In this view 85 designates a tree and 86 a stump at some distance therefrom. The jack 25 is suspended from the top of the tree by a cable 87 attached to clevis 26 and is held out from the tree by a cable 89 attached to clevis 29 and extended to the stump.

In Fig. 11 is another means of cable suspension in which a jack is shown as suspended between the upper ends of two trees 90 and 91 by cables 92 and 93 attached to the jack clevises. Guys 94 are extended outwardly from the trees to prevent them bending toward each other under load.

The carriage retaining mechanism as thus applied, provides a positive means for locking the carriage on the track cable without any interference with its travel in either direction. Positive means is provided also for effecting the unlocking of the retaining means and for holding the carriage while passing the jack and a positive means for effecting the relocking of the carriage after it has passed the jack.

This retaining means makes possible a relatively high speed operation for yarding logs from both sides of the track cable and positive means for preventing the carriage being dismounted by reason of uneven side load.

Having thus described my invention, what I claim as new therein and desire to secure by Letters Patent, is:

1. A carriage designed for travel on a trackway that is supported upon hanger shoes; said carriage comprising a frame, wheels mounted in the frame in tandem, for guided travel on the trackway, a retaining member, a mounting member therefor, a seat in the frame upon which the said mounting member is normally disposed to positively hold the said retaining member against the under side of the cable between the grooved wheels to prevent their displacement from the cable, and from which seat said mounting member is displaceable by contact of the retaining member with a hanger shoe for movement of the shoe away from the cable, and a resilient supporting mechanism for the said mounting member operable to restore it to the seat and the restraining member to functional position after passing each shoe.

2. A carriage designed for travel on a cable supported at intervals therealong upon hanger shoes; said carriage comprising a frame, wheels mounted in tandem on the frame for guided travel on the cable, a retaining member, a mounting therefor, supporting mechanism for the said mounting movably attached to the frame, a seat in the frame upon which said mounting for the retaining member is normally rested to positively hold the retaining member against the under side of the cable between its points of contact with the wheels to prevent their displacement from the cable, and from which seat said mounting will be displaced by contact of the retaining member with a shoe to permit the retaining member to pass the shoe; said supporting mechanism including resilient means operable to automatically restore the mounting of the retaining member to said seat after passing each shoe.

3. An open side carriage designed for travel on a taut cable that is supported at intervals therealong by hangers equipped with shoes upon which the cable is disposed and secured; said carriage comprising a frame equipped for the suspending of a load therefrom, grooved wheels mounted in tandem on the frame for travel on said cable, a retaining wheel, a mounting member for said wheel, a seat in the frame upon which said mounting member is normally displaceably rested to hold the said retaining wheel in rolling contact with the under side of the cable and in fixed spacing relative to the plane of the axes of the grooved wheels, mechanism on the frame operable to normally hold said mounting on said seat; said mechanism including a resilient element that will yield under impact of the retaining wheel with a hanger shoe for the displacement of the said mounting member from the seat and movement thereof away from the plane of the axes of the grooved wheels for the passing of the roller across the under side of the shoes and which resilient element will effect the automatic replacement of the said mounting member on the seat after passing each shoe.

4. An open side carriage designed for travel on a taut cable supported by a hanger equipped with a shoe upon which the cable is mounted and secured; said carriage comprising a frame, grooved wheels mounted in tandem on the frame for travel on the cable across the shoe, a retaining wheel, a mounting shaft for the wheel, a support in the frame on which said mounting shaft may be rested to hold the wheel in rolling contact with the under side of the cable at a definite spacing from the plane of the axes of the grooved wheels, and from which support said shaft will be displaced by impact of the wheel with the hanger shoe as the carriage travels along the cable, said frame having a downwardly directed guideway formed therein to receive the said wheel mounting shaft when displaced from the said support and in which it can move as required to permit the said retaining wheel to pass across the under side of the shoe, and a mounting means for the shaft pivotally fixed to the frame, and spring means acting against the said mounting means and against the frame to automatically move the mounting means to restore the shaft to a position of rest on the support with the passing of the wheel from the shoe.

5. A carriage as recited in claim 4 wherein the said support is formed with a retaining seat for receiving the said wheel mounting shaft, and in which the said shaft normally rests and is yieldingly held against displacement by the pressure of the cable against the wheel, and from which seat the said shaft is permitted to be unseated by a relative upwardly displacement of the cable between its points of contact with the grooved wheels.

6. An open side carriage designed for travel on a taut cable supported by hangers equipped with shoes on which the cable is mounted and secured; said carriage comprising a frame, grooved wheels mounted on said frame in tandem for travel on the said cable, a retaining wheel, a supporting shaft for the wheel, a pedestal in the frame upon which said shaft is normally rested to support the said retaining wheel in rolling contact with the under side of the cable between the grooved rollers and at a definite spacing from the plane of the axes of said grooved rollers, toggle linkage pivotally mounted on the frame for supporting said shaft on the pedestal and for movement from the pedestal and away from the cable as required for the passing of the retaining wheel across the under sides of the shoes as the carriage travels along the cable, and a spring acting against the linkage and frame to normally and yieldingly hold the toggle linkage in position to dispose the shaft on said pedestal, and operable to automatically return the displaced shaft to a position of support on the pedestal upon the wheel passing over each shoe.

7. A carriage as recited in claim 6 wherein the frame is formed with an inverted U-shaped slot that defines the said pedestal between the leg portions of the slot, and along which slot the said shaft is moved, when displaced from the pedestal, into one or the other of the legs thereof for the travel of the wheel across the shoe.

8. An open side carriage designed for travel on a taut cable that is supported at intervals therealong by hangers equipped with shoes upon which the cable is disposed and secured; said carriage comprising a frame equipped for the suspending of a load therefrom, grooved wheels mounted at opposite ends of the frame for travel on the cable, a retaining wheel, a mounting shaft for the wheel, a pedestal in the frame upon which said wheel mounting shaft is normally rested to hold the said wheel in rolling contact with the under side of the cable and at fixed spacing from the plane of the axes of the grooved wheels to prevent their displacement from the cable, a guideway in the said frame for movement of the said mounting shaft therein, and extended across the said pedestal and downwardly at opposite sides thereof, toggle linkage pivotally fixed to the frame and to the shaft and normally positioning the shaft upon the pedestal and permitting its movement therefrom and downwardly in the guideway to the extent required for the passing of the retaining wheel across the under side of the cable supporting shoes, and a resilient element associated with the said devices and operable thereagainst to automatically restore the said mounting shaft to position of rest on the support with the passing of the wheel from a shoe.

9. In combination, a tramway cable supported upon hanger shoes, and an open side carriage equipped with grooved wheels in tandem for travel on the cable, a retaining wheel, a mounting shaft therefor, a pedestal in the carriage upon which the shaft may be rested to positively hold the retaining wheel at a fixed spacing from the plane of the axes of the grooved wheels and in rolling contact with the under side of the cable, linkage pivoted on the carriage and shaft for normally holding the shaft on and permitting its displacement from the said pedestal for passage of the wheel across the under sides of the shoes as the carriage travels along the cable, and a spring mounted on the carriage and acting against the said linkage to maintain a holding pressure of the wheel against the shoes and for the automatic restoration of the shaft to the pedestal upon passing each shoe.

10. An open side carriage comprising a load supporting frame structure, wheels mounted thereon in tandem for travel on a tram way cable; said frame structure including a longitudinally extending and vertically disposed plate, formed at a level below the wheels with a slot of inverted U-shaped direction defining a pedestal between the leg portions thereof, and said pedestal being provided at its upper end with an upwardly facing seat, a retaining wheel at one side of the plate adapted for rolling contact with the under side of the tram way cable, a supporting shaft for the wheel extended through the said slot and adapted to rest within the seat of said pedestal to hold the retaining wheel against the cable, the base portion of said slot providing clearance in the slot above the shaft for its displacement from the seat into one or the other of the legs of the slot for an adjustment of the wheel away from the cable, levers pivotally mounted on the said plate, and linkage connecting said levers with said shaft for the functional support of the retaining wheel, and a spring mounted on the plate and exerting pressure against the levers to normally retain the shaft on the seat and for an automatic return of the shaft to a position of support on the pedestal after being displaced therefrom.

SIDNEY S. McINTYRE.

REFERENCES CITED

The following references are of record in the file of this patent:

UNITED STATES PATENTS

| Number | Name | Date |
|---|---|---|
| 890,073 | Lambert | June 9, 1908 |
| 901,021 | Miller | Oct. 13, 1908 |
| 1,065,399 | Spaulding | June 24, 1913 |